Jan. 1, 1952  J. KOLBE  2,580,557
VEHICLE WITH INDEPENDENT WHEEL SUSPENSION
Filed Sept. 2, 1947  4 Sheets-Sheet 1

INVENTOR
Joachim Kolbe
By
Attorney

Jan. 1, 1952   J. KOLBE   2,580,557
VEHICLE WITH INDEPENDENT WHEEL SUSPENSION
Filed Sept. 2, 1947   4 Sheets-Sheet 2

INVENTOR.
Joachim Kolbe
By Elwin A. Andrus
Attorney

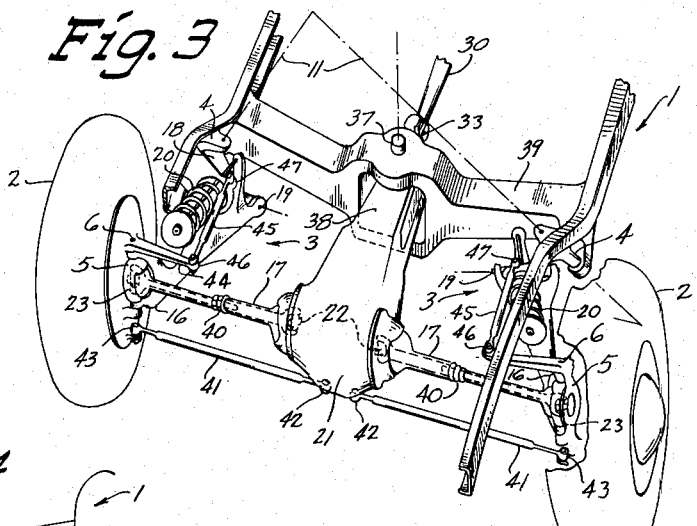
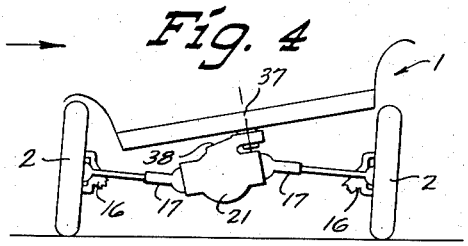
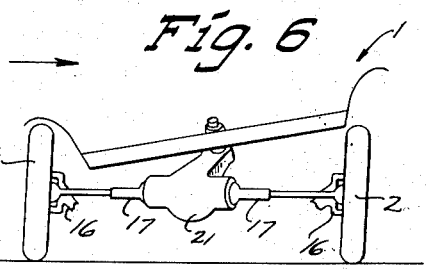
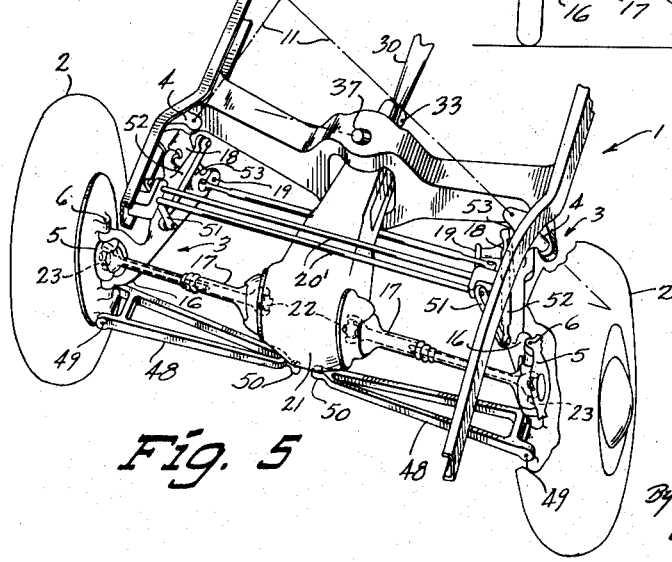

Jan. 1, 1952                  J. KOLBE                  2,580,557
VEHICLE WITH INDEPENDENT WHEEL SUSPENSION
Filed Sept. 2, 1947                                    4 Sheets-Sheet 4
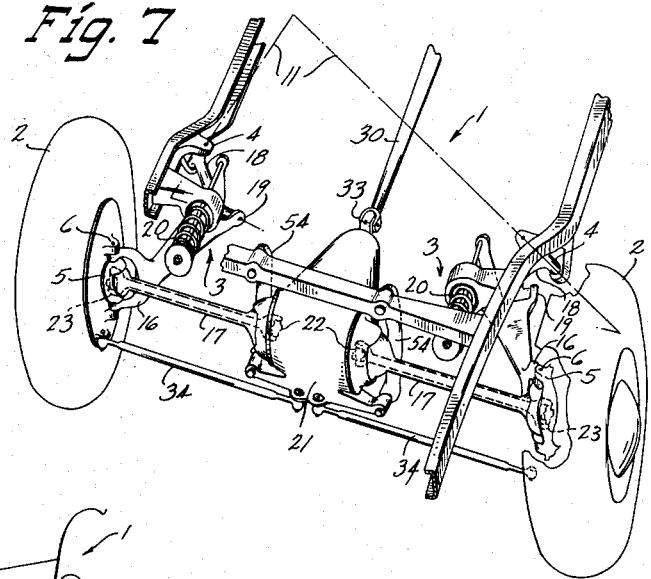
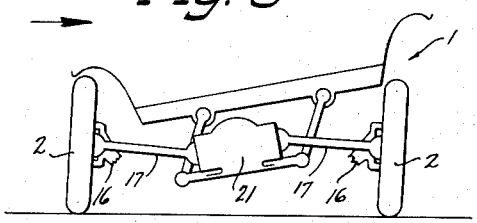
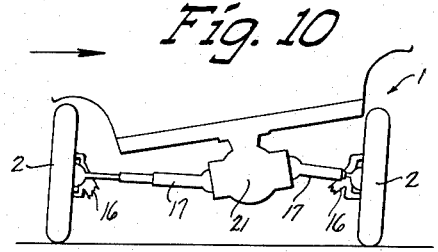
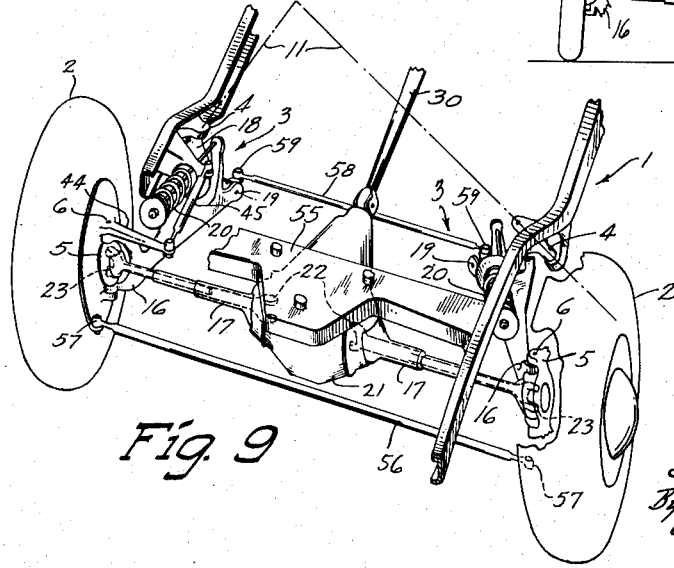
INVENTOR
Joachim Kolbe
Attorney Patented Jan. 1, 1952

2,580,557

UNITED STATES PATENT OFFICE 2,580,557

VEHICLE WITH INDEPENDENT WHEEL SUSPENSION

Joachim Kolbe, Milwaukee, Wis.

Application September 2, 1947, Serial No. 771,717

27 Claims. (Cl. 180—73)

This invention relates to vehicles with fully independent wheel suspensions for all wheels and is particularly applicable to self-propelled vehicles having four or more wheels and in which at least one pair of wheels or more are drive wheels and at least one pair of wheels or more are steerable wheels.

Where a vehicle such as a family automobile has four wheels it is possible with the present invention to drive with either the front or back wheels alone or with all four wheels and to steer with either the front wheels alone or with both the front and back wheels.

One of the principal objects of the invention is to provide such a vehicle in which at least the drive wheels are fully independently suspended.

Another object is to provide a selected predetermined control of the position of the independently suspended drive wheels at all times.

Another object is to more nearly equalize the angular movement of the drive shaft joints where the drive wheels are independently suspended.

Another object is to provide a vehicle in which the unsprung weight is reduced to only the wheels and their immediate appurtenances, and the superstructure including all sprung weight is supported in a manner providing for inward banking on turns.

Another object is to provide a vehicle construction in which the differential may be fixed directly to the superstructure, thereby making it possible to locate the engine anywhere in the superstructure that is desirable, and providing for a superstructure having a lower center of gravity.

Another object is to provide a fully independent drive wheel suspension of the inward banking type having an effective wheel knuckle which is either secured against turning or guided for steering purposes.

Another object is to provide a fully independent drive wheel suspension in which the wheels are guided by banking arms and steered or secured against steering, and in which the steering position of the wheels is entirely independent of the banking movement of the superstructure.

Another object is to provide for angular movement between the drive wheels and their corresponding drive shafts to effect driving of the wheels independently of the wheel suspension.

Another object is to reduce side sway of the longitudinal drive shaft and substantially eliminate vertical sway thereof.

Another object is to more nearly equalize the angular movements of the several universal joints employed in the drive mechanism for the wheels.

The invention utilizes the principles of automatically inward banking vehicles to provide the desired control of wheel position for both vertical oscillation and banking movements. Any of the banking arms employing independent wheel suspension embodiments of the copending applications Serial No. 724,062, filed January 24, 1947, now Patent No. 2,576,686, granted November 27, 1951, and Serial No. 742,496, filed April 19, 1947, by the present inventor, are applicable to the present invention. Reference is also made to the following earlier applications disclosing banking arms with independent wheel suspensions which may be adapted to the present invention: application Serial No. 522,269, filed February 14, 1944, now abandoned, application Serial No. 638,210, filed December 29, 1945, now abandoned, and application Serial No. 641,707, filed January 17, 1946, now abandoned. The present invention is described and illustrated in application Serial No. 522,269, above referred to.

The invention is illustrated as applied to a family passenger automobile having four wheels, and in which the two front wheels are steerable and the two rear wheels constitute the drive wheels and are non-steerable.

In the accompanying drawings:

Fig. 3 is a perspective of the rear end of a vehicle showing a modified construction utilizing a vertical pivot for swinging of the differential;

Fig. 4 is a diagrammatic rear end elevation of the construction of Fig. 3 shown in banked position;

Fig. 5 is a view similar to Fig. 3 showing the use of an inclined pivot for swinging of the differential to obtain a desired control of the position of the wheels;

Fig. 6 is a diagrammatic rear end elevation of the construction of Fig. 5 shown in banked position;

Fig. 7 is a view similar to Fig. 5 in which the differential is suspended from the superstructure by links in place of the pivotal arm construction of previous figures;

Fig. 8 is a diagrammatic rear end elevation of the construction of Fig. 7 shown in banked position;

Fig. 9 is a similar view in which the differential is fixed to the superstructure;

Fig. 10 is a diagrammatic rear end elevation of the construction of Fig. 9 shown in banked position;

Figure 11:
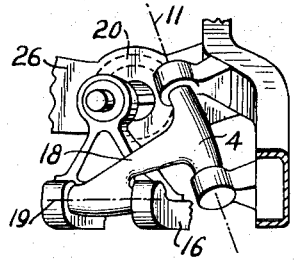
Fig. 11 is a detail enlarged perspective view showing the construction of the upper part of one of the rear banking arms of Figs. 1 and 2.

The vehicle illustrated has a superstructure 1 constituting the sprung weight which includes the frame, engine and body. The superstructure 1 is supported on four wheels 2, the front pair of wheels being steerable and the rear pair of wheels constituting the drive wheels.

Each wheel 2 constitutes the outer end of a banking arm 3, as set forth in copending application Serial No. 724,062, referred to above. The banking arms 3 are disposed in pairs corresponding to the pairs of wheels and each arm is secured to superstructure 1 by an inclined banking hinge 4.

The wheel knuckle 5 of each corresponding wheel is suspended by a vertical hinge 6 similar to a kingpin construction for steerable wheels.

The wheel knuckles 5 for the front wheels constitute the steering knuckles. The wheel knuckles 5 for the rear wheels are preferably secured against steering as described hereinafter.

Each banking arm 3 which contains a steerable front wheel 2 comprises a kingpin support 7 which is pivoted on a substantially horizontal axis to a lower suspension arm 8 and on a similar axis to an upper suspension arm 9. The inner ends of the suspension arms 8 and 9 are pivoted on substantially horizontal axes to a banking hinge support member 10 which, in turn, is pivoted to the superstructure on a banking axis 11, as described in the copending applications referred to above.

The coil spring 12 for each front banking arm is confined between the lower suspension arm 8 and a spring actuating arm 13 fulcrumed on the superstructure by pivotal joint 14 and which is connected to be actuated by the banking hinge support member 10 by means of a shackle 15 therebetween.

The hinge or kingpin 6 for each rear drive wheel is made in two bearing sections and the outer end of the suspension part 16 of arm 3 is forked vertically to accommodate the drive shaft 17 for the wheel.

Referring to the rear end construction, the suspension part 16 for each rear banking arm 3 is connected to a banking support member 18 by a substantially horizontal pivot 19 therebetween constituting the hinge for vertical oscillation of the wheel. A spring 20 is disposed between the banking arm and the superstructure to be actuated by either the vertical oscillation of the wheel effecting a turn about the hinge 19 or by lateral movement of the superstructure as caused by centrifugal forces on a curve and effecting a turn at the banking hinge 4.

The drive for the rear wheels is effected by the corresponding drive shafts 17 which extend thereto from opposite sides of the differential 21. The inner end of each shaft 17 is connected to a corresponding drive member in the differential 21 by means of a universal joint 22. The outer end of each shaft 17 is connected to the drive plate of the corresponding wheel 2 by means of a universal joint 23.

The drive plate member for each rear wheel 2 is journaled in suitable bearings in the brake housing part of the wheel knuckle 5.

In carrying out the invention the outer ends of each pair of banking arms 3 are tied together to maintain the distance between the corresponding wheels 2 substantially constant, and means are provided for either steering or block steering of the wheels. Where required the drive shafts 17 and their end connections are relieved of longitudinal stress as by making the shafts extensible.

Figure 1:
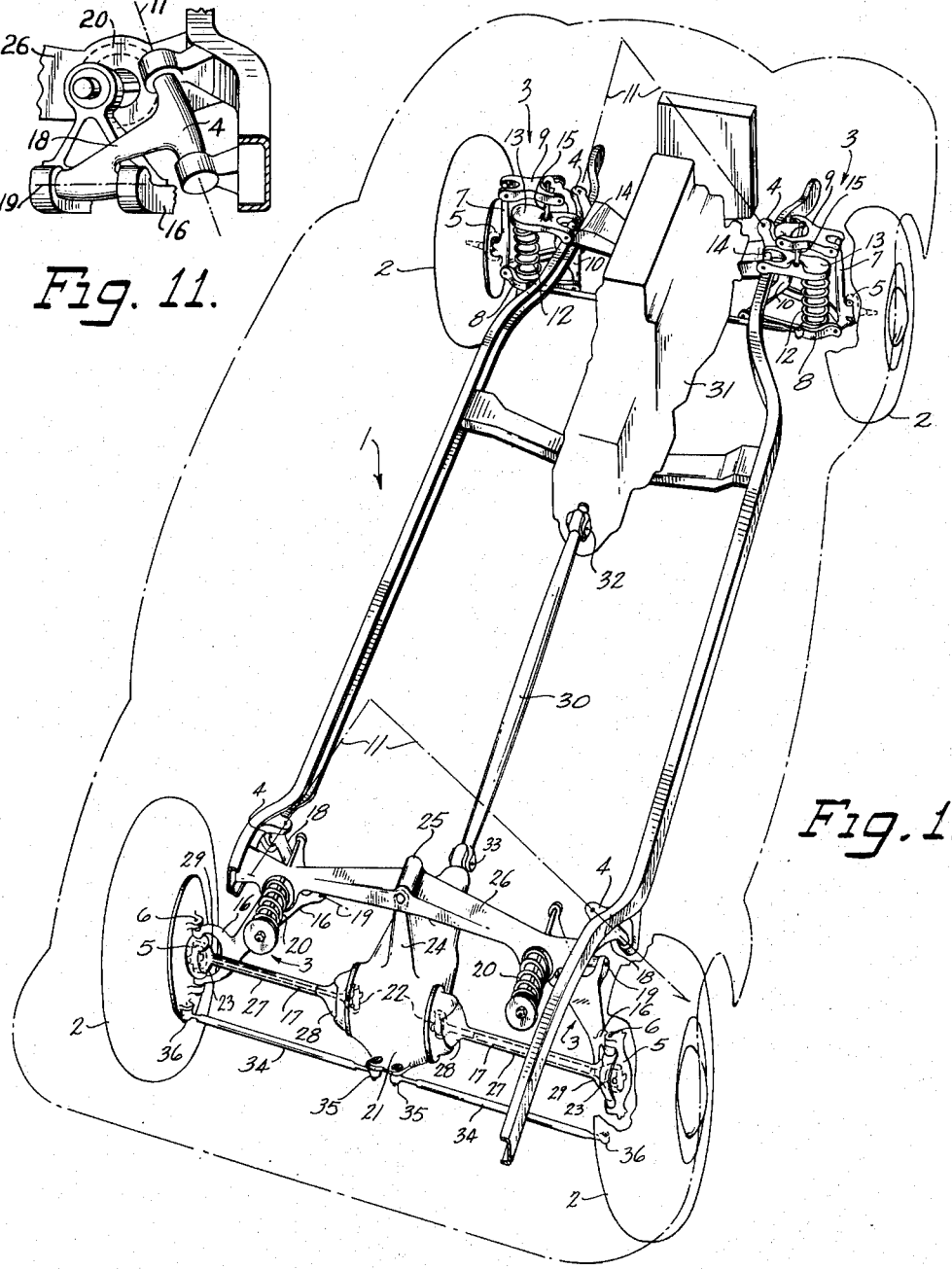
Figure 1 is a perspective partially diagrammatic view of a vehicle embodying the invention employing banking arms for controlling the wheel position and in which the differential is suspended from the superstructure to float laterally relative thereto.
Figure 12:
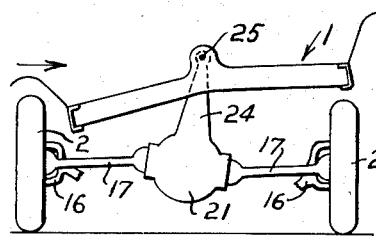
Fig. 12 is a diagrammatic rear end elevation showing the parts in the position of Fig. 2.
Figure 2:
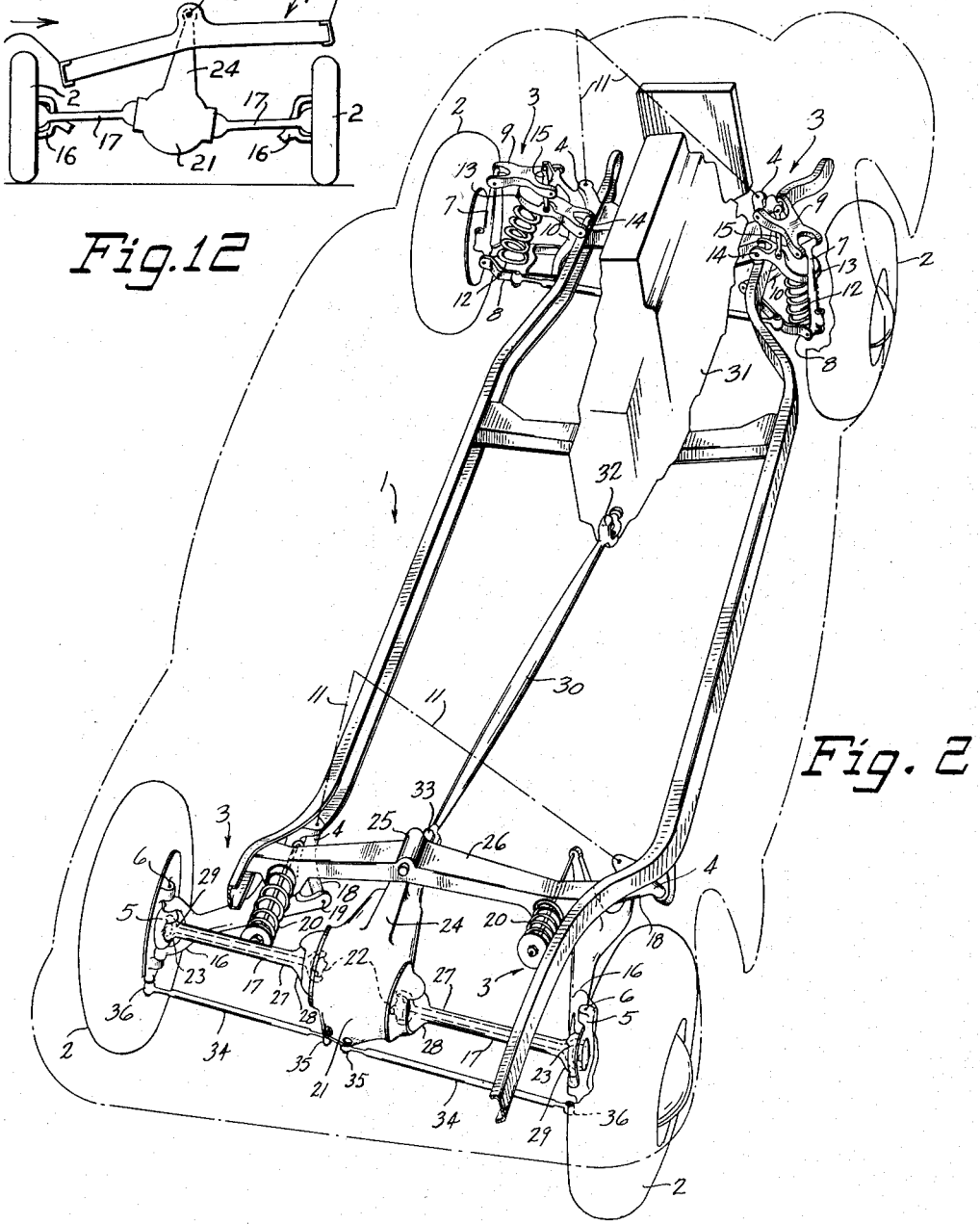
Fig. 2 is a view similar to Fig. 1 showing the superstructure in inward banked position as on a turn.

In the construction of Figs. 1 and 2, the differential 21 is suspended from the superstructure by means by a vertical arm 24 extending upwardly therefrom and pivoted at 25 to a frame crossmember 26 at a position beneath or to the rear of the rear seat of the vehicle. The axis of pivot 25 is shown horizontal and parallel to the longitudinal center line of the superstructure.

The drive shafts 17 are non-extensible and are housed in corresponding tubular housings 27 connected to the differential 21 by large hollow ball joints 28 and to the corresponding wheel knuckles 5 by large hollow ball joints 29. The shaft housings 27 and differential housing 21 serve to maintain a substantially constant distance between the wheels 2 and constitute the tie between the outer ends of the banking arms.

The main drive shaft 30 for differential 21 extends forwardly from the differential to the engine 31 located at the forward end of the superstructure, and has a universal joint 32 adjacent the engine and a similar universal joint 33 adjacent the differential to provide for relative lateral movement between the engine and differential.

The drive wheels 2 may be steered similar to the front wheels 2, or where only the front wheels are steerable the drive wheels may be blocked against steering.

In Figs. 1 and 2 the differential 21 is employed to block steer the wheels 2 by means of tie rods 34 disposed to the rear of shafts 17 and substantially parallel thereto. Tie rods 34 are connected at their inner ends to differential housing 21 by ball and socket joints 35 and at their outer ends to the corresponding brake drums of wheel knuckles 5 by similar ball and socket joints 35 disposed either rearwardly or forwardly from hinges 6.

In operation, each drive wheel is free to oscillate vertically in response to road unevenness. By reason of the fact that the superstructure is supported by banking arms the vertical oscillation of any wheel relative to the superstructure can be reduced without reducing the softness of ride obtainable. This results in less angular movement for the universal joints 22 and 23.

When the vehicle passes around a curve or turn in the road, centrifugal forces cause a movement of superstructure 1 laterally toward the outside of the curve effecting a turn at the banking hinges 4 and operation of the banking arms 3 to bank the superstructure inwardly of the curve. The upright position of the wheels 2 during banking is determined by the location of banking hinges 4.

In the construction of Figs. 1 and 2 the differential 21 tilts to the outside during inward banking of the superstructure on turns and tends to reduce the distance between the wheels. The wheels tend to tilt inwardly or outwardly or remain vertical during banking depending upon the banking geometry provided by the location of the banking hinges relative thereto. The tie rods 34 secure the wheel knuckles against substeering.

The construction of Figs. 3 and 4 is similar to that of Figs. 1 and 2, except that the differential 10 swings on a vertical pivotal axis 37 instead of the horizontal axis 25, and the arm 38 extends forwardly from the differential and houses a rear extension for the main drive shaft 30. The universal joint 33 for main drive shaft 30 is disposed at or near the axis 37 to provide freedom of swinging of the shaft extension with the differential. The pivot 37 is disposed in a cross frame member 39.

In this construction the drive shafts 17 are made extensible by splines 40 therein and the differential 21 is held centrally of the wheels 2 by means of tie rods 41 disposed in the vertical plane of drive shafts 17 with their inner ends connected to the differential housing by ball and socket joints 42 and their outer ends connected to the corresponding brake drum housings of wheel knuckles 5 by ball and socket joints 43 disposed directly beneath and in vertical alignment with the corresponding hinges 6.

The wheels 2 are block steered in this construction by means of steering arms 44 rigidly secured to the brake drum housings of wheel knuckles 5. Drag links 45 have their outer ends pivotally connected by ball and socket joints 46 to the corresponding steering arms 44 and their inner ends connected by ball and socket joints 47 to the cross frame member 39. The joint 47 for each link 45 should be located at a point where the turn of the corresponding banking arm 3 about its banking axis 4 will be neutral with respect to steering of the wheel. The construction may utilize the principles of the copending application Serial No. 642,263, now abandoned, filed by the present inventor on January 19, 1946, for Inward Banking Vehicle With Steering Mechanism Therefor, in which, as applied to the present construction, a line drawn from the center of the hinge 6 of one banking arm to the center of the corresponding hinge 4 and a line drawn from the center of the pivotal joint 46 between the corresponding arm 44 and link 45 to the center of corresponding joint 47 are substantially parallel in plan view at all times.

In the construction of Figs. 3 and 4 the vertical oscillation of the drive wheels 2 is the same as in Figs. 1 and 2. During banking of the superstructure the differential 21 tilts with the superstructure. Both vertical and lateral swinging of the main drive shaft 30 may be entirely avoided in this construction. The wheels 2 may be tilted to the outside during banking on a turn without producing substantial angular movements at joints 23.

The construction of Figs. 5 and 6 is similar to that of Figs. 3 and 4 except that the pivotal axis 37 is inclined upwardly toward the rear to provide a swinging movement between the differential 21 and superstructure 1 that maintains the differential 21 substantially level during banking of the superstructure. The shafts 17 may be maintained in alignment in elevational view during banking, while a slight angular movement will occur in joints 22 and 23 in plan view. The construction also has the advantage of avoiding any substantial swinging of the main drive shaft 30.

Figs. 5 and 6 also illustrate another construction for blocking the steering of drive wheels 2. For this purpose each link 48 extending between the corresponding brake housings of wheel knuckles 5 and differential housing 21 has its outer ends hinged to the brake housing at 49 and its inner end connected to the corresponding differential housing by means of a ball and socket joint 50. By this means the wheel knuckles 5 are maintained substantially parallel at all times.

The construction of Figs. 5 and 6 also employs torsion springs 20' in place of the coil springs 20 of the other figures. One end of each torsion spring 20' is fixed to the superstructure and the other end has a crank arm 51 which is operated by the actuating rod 52 connected to a bell crank arm 53 on the suspension arm 16 similar to the actuating rod for the coil spring construction of the other figures.

The construction of Figs. 7 and 8 is similar to that of Figs. 1 and 2, except that the differential 21 is suspended by means of a pair of vertical links 54 instead of by the arm 24, so that the effective pivotal axis is near to infinity, thereby tilting the differential in the same direction and to substantially the same extent as the superstructure is tilted in banking. By diverging the links 54 downwardly the differential may be maintained substantially horizontal during banking of the superstructure.

In this construction the separation of wheels 2 may be maintained substantially constant by the shafts 17 themselves. The tie rods 34 serve to block steer the wheels as in the construction of Figs. 1 and 2.

The construction of Figs. 9 and 10 has the differential 21 fixed to a cross-member 55 of the superstructure frame so that the differential moves laterally with the superstructure during banking. With this construction the differential and superstructure do not move relative to each other and the main drive shaft 30 need not have any universal joint therein. The engine 31 may be positioned at any convenvent location in the superstructure, making possible rear engine construction, if desired.

In this construction the shafts 17 are extensible, as in Figs. 3 to 6. The wheels 2 are block steered by a single steering arm 44 and drag link 45 for one wheel knuckle 5 and a tie rod 56 having ball and socket connections 57 at its opposite ends with the corresponding brake housings of knuckles 5. The connections 57 are disposed either to the rear or forwardly of joints 22 and 23 for shafts 17 and of hinges 6. The banking arms 3 are maintained in correlation by means of a tie rod 58 which is secured at its opposite ends to the corresponding banking support members 18 by suitable ball and socket joints 59.

The pivotal connections and ball and socket joints referred to herein may be of the rubber torsion type or of any type giving the corresponding effect of a pivot or of a ball and socket, respectively.

The several embodiments illustrated for block steering of the rear wheels 2 may be interchanged and employed with any form of construction for the banking arms and drive connections. In the embodiments in which one or more drag links 45 are employed for block steering the wheels, the drag links 45 may be used to obtain a desired steering control for the wheels the same as for the front wheels.

One of the advantages of the invention lies in its versatility of adaptation to various designs and constructions. It can be used with either swinging differential or fixed differential construction, with either separate vertical oscillation and banking springs or dual spring function, and with either actual steering or blocked steering.

The invention provides a substantially softer ride with fully independent suspension of at least the drive wheels and positive control of wheel position at all times.

Furthermore, the invention provides for inward banking of the superstructure on curves.

The advantage of reducing the swinging of the main drive shaft is applicable to hydraulic connections where the differential 21 is of a hydraulic converter type instead of a gear type of construction.

Various embodiments of the invention may be employed within the scope of the accompanying claims.

I claim:

1. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of road wheels carried at the outer ends of the corresponding arms by wheel knuckles each having a substantially vertical kingpin support therefor, the interconnection of said last named banking arms being disposed to maintain the distance between said kingpins substantially constant and comprising a tie rod extending inwardly from each banking arm and a support for the inner ends of said tie rods carried by the superstructure, and means to control the pivotal movement at said kingpins.

2. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of road wheels carried at the outer ends of the corresponding arms by wheel knuckles each having a substantially vertical kingpin support therefor, the interconnection of said last named banking arms being disposed to maintain the distance between said kingpins substantially constant and comprising a tie rod extending inwardly from each banking arm and a support for the inner ends of said tie rods carried by the superstructure, and means to control the pivotal movement at said kingpins, said tie rod support being pivotally connected to the superstructure to govern movement of said tie rods in correlation to the action of said banking arms.

3. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of drive wheels carried at the outer ends of the corresponding arms by wheel knuckles each having a substantially vertical kingpin support therefor, a differential carried by the superstructure and disposed intermediate said wheels, a drive shaft extending from said differential to each of said wheels and having a universal joint at each end, the outer universal joint for each drive shaft being disposed substantially at the intersection of the axis of the corresponding wheel and of said kingpin, the interconnection of said last named banking arms being disposed to maintain the distance between said kingpins substantially constant and comprising a tie between the differential housing and each banking arm, and means to control the pivotal movement at said kingpins.

4. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of drive wheels carried at the outer ends of the corresponding arms by wheel knuckles each having a substantially vertical kingpin support therefor, a differential carried by the superstructure and disposed intermediate said wheels, a drive shaft extending from said differential to each of said wheels and having a universal joint at each end, the outer universal joint for each drive shaft being disposed substantially at the intersection of the axis of the corresponding wheel and of said kingpin, the interconnection of said last named banking arms being disposed to maintain the distance between said kingpins substantially constant and comprising a tie between the differential housing and each banking arm, and means to control the pivotal movement at said kingpins, said differential being pivotally connected to the superstructure to govern the relative movement between the wheels and differential in correlation to the action of said banking arms.

5. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of drive wheels carried at the outer ends of the corresponding arms by wheel knuckles each having a substantially vertical kingpin support therefor, a differential carried by the superstructure and disposed intermediate said wheels, an extensible drive shaft extending from said differential to each of said wheels and having a universal joint at each end, the outer universal joint for each drive shaft being disposed substantially at the intersection of the axis of the corresponding wheel and of said kingpin, the interconnection of said last named banking arms being disposed to maintain the distance between said kingpins substantially constant and comprising a tie between the differential housing and each banking arm, and means to control the pivotal movement at said kingpins.

6. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of drive wheels carried at the outer ends of the corresponding arms by wheel knuckles each having a substantially vertical kingpin support therefor, a differential carried by the superstructure and disposed intermediate said wheels, a drive shaft extending from said differential to each of said wheels and having a universal joint at each end, the outer universal joint for each drive shaft being disposed substantially at the intersection of the axis of the corresponding wheel and of said kingpin, the interconnection of said last named banking arms being disposed to maintain the distance between said kingpins substantially constant and comprising a tie between the differential housing and each banking arm, each of said last named banking arms embodying suspension means for independent vertical oscillation of the respective wheels and common resilient means controlling both said vertical oscillation of the wheels and the banking action of said arms, and means to control the pivotal movement at said kingpins.

7. A vehicle comprising a superstructure, a plurality of pairs of wheels including a pair of drive wheels, an inward banking mounting for said superstructure whereby lateral movement of the superstructure on the curves in response to centrifugal forces effects an inward banking of the superstructure, said inward banking mounting including an independent suspension for each wheel pivotally secured to the superstructure upon an inclined axis with the two suspensions for said pair of drive wheels interconnected and correlated to act in unison in a manner tending to change the direction of the wheels relative to the superstructure during banking, a differential disposed between said drive wheels, a drive shaft for each drive wheel extending from said differential to the wheel, a universal joint at each end of each drive shaft to provide for vertical oscillation of each drive wheel relative to said differential, means to maintain said drive wheels at a substantially constant distance apart, a wheel knuckle for each of said drive wheels disposed to pivot on a substantially vertical kingpin axis, and means to control the pivotal movement at said kingpins.

8. A vehicle comprising a superstructure, a plurality of pairs of wheels including a pair of drive wheels, an inward banking mounting for said superstructure whereby lateral movement of the superstructure on curves in response to centrifugal forces effects an inward banking of the superstructure, a differential disposed between said drive wheels, an extensible drive shaft for each drive wheel extending from said differential to the wheel, a universal joint at each end of each drive shaft to provide for vertical oscillation of each drive wheel relative to said differential, means to control the position of the drive wheels at all times, and common resilient means actuated both by the banking movement of the superstructure and by the vertical oscillation of said wheels to prevent the latter action at least partially during said banking movement.

9. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and means to carry said differential as a part of the sprung weight of said superstructure.

10. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and means suspending said differential from said superstructure to provide floating of the differential relative to the superstructure.

11. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and an arm on said differential pivoted to said superstructure to support the differential and to provide floating of the differential relative to the superstructure.

12. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and an arm on said differential pivoted to said superstructure on a substantially horizontal axis spaced above the differential to support the differential and to provide floating of the differential relative to the superstructure.

13. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and an arm on said differential pivoted to said superstructure on a substantially horizontal axis spaced above the differential to support the differential and to provide floating of the differential relative to the superstructure, said banking arms for the drive wheels being disposed to effect outward tilting of the wheels during inward banking of the superstructure on curves to reduce the wheel space required for the construction of the superstructure.

14. A vehicle of the class described, comprising a superstructure having a longitudinally extending drive shaft, a plurality of pairs of wheels including a pair of drive wheels therefor, a corresponding number of pairs of interconnected banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels and connected to the rear end of said longitudinal drive shaft, an extensible drive shaft for each drive wheel extending from said differential to the wheel, a universal joint at each end of each extensible drive shaft to provide for vertical oscillation of each drive wheel relative to said differential, and an arm on said differential pivoted to said superstructure on a substantially vertical axis spaced forwardly of the differential to support the differential and to provide floating of the differential relative to the superstructure without substantial swinging of the longitudinal drive shaft relative to the superstructure.

15. A vehicle of the class described, comprising a superstructure, a plurality of pairs of wheels including a pair of drive wheels therefor, a corresponding number of pairs of interconnected banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels, an extensible drive shaft for each drive wheel extending from said differential to the wheel, a universal joint at each end of each extensible drive shaft to provide for vertical oscillation of each drive wheel relative to said differential, and an arm on said differential pivoted to said superstructure on a substantially vertical axis spaced forwardly of the differential to support the differential and to provide floating of the differential relative to the superstructure.

16. A vehicle of the class described, comprising a superstructure, a plurality of pairs of wheels including a pair of drive wheels therefor, a corresponding number of pairs of interconnected banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels, an extensible drive shaft for each drive wheel extending from said differential to the wheel, a universal joint at each end of each drive shaft to provide for vertical oscillation of each drive wheel relative to said differential, and an arm on said differential pivoted to said superstructure on an inclined axis passing forwardly of said differential and upwardly rearwardly thereover to support the differential and to provide floating of the differential relative to the superstructure.

17. A vehicle of the class described, comprising a superstructure, a plurality of pairs of wheels including a pair of drive wheels therefor, a corresponding number of pairs of interconnected banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels, an extensible drive shaft for each drive wheel extending from said differential to the wheel, a universal joint at each end of each drive shaft to provide for vertical oscillation of each drive wheel relative to said differential, and means connecting said differential to the superstructure to provide pivotal movement of the differential on an effective inclined axis correlated to the movement of the banking arms to maintain said universal joints substantially in alignment during banking.

18. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels, a drive shaft for each drive wheel extending from said differential to the wheel, a universal joint at each end of each drive shaft to provide for vertical oscillation of each drive wheel relative to said differential, means suspending said differential from said superstructure to provide floating of the differential relative to the superstructure, an engine carried by the superstructure, a drive shaft between the engine and differential, and at least one universal joint in said last-named drive shaft to provide for swinging of the differential relative to the superstructure.

19. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels, a drive shaft for each drive wheel extending from said differential to the wheel, a universal joint at each end of each drive shaft to provide for vertical oscillation of each drive wheel relative to said differential, means suspending said differential from said superstructure to provide floating of the differential relative to the superstructure, an engine carried by the superstructure at the end opposite said differential, a longitudinal drive shaft between the engine and differential, and at least one universal joint in said last named drive shaft to provide for swinging of the differential relative to the superstructure.

20. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain said drive wheels at a substantially constant distance apart, a differential disposed between said drive wheels, an extensible drive shaft for each drive wheel extending from said differential to the wheel, a universal joint at each end of each drive shaft to provide for vertical oscillation of each drive wheel relative to said differential, an arm on said differential pivoted to said superstructure on a substantially vertical axis spaced forwardly of the differential to support the differential and to provide floating of the differential relative to the superstructure, an engine carried by the superstructure at the end opposite said differential, a longitudinal drive shaft between the engine and differential, and a universal joint in said last-named drive shaft and disposed substantially at the axis of said pivotal connection between the differential and superstructure.

21. A vehicle comprising a superstructure, a plurality of pairs of wheels for supporting the same including at least one pair of drive wheels, flexible means for driving said drive wheels, a wheel knuckle pivotal upon a substantially vertical axis for guiding each drive wheel, an independent suspension for each pair of wheels providing for inward banking of the superstructure on curves and for vertical oscillation of the wheels and wherein the wheels tend to change in direction relative to the superstructure during banking, and means to guide said wheel knuckles to maintain said wheels substantially parallel to the superstructure in plan view.

22. A vehicle comprising a superstructure, a plurality of pairs of wheels for supporting the same including at least one pair of drive wheels, flexible means for driving said drive wheels, a wheel knuckle pivotal upon a substantially vertical axis for guiding each drive wheel, a banking arm suspension for each drive wheel providing for independent vertical oscillation of the wheels, means to maintain the distance between said drive wheels substantially constant at all times, and means to guide said wheel knuckles to maintain said wheels substantially parallel in plan view at all times.

23. A vehicle comprising a superstructure, a plurality of pairs of wheels for supporting the same including at least one pair of drive wheels, flexible means for driving said drive wheels, a wheel knuckle pivotal upon a substantially vertical axis for guiding each drive wheel, a banking arm suspension for each drive wheel providing for independent vertical oscillation of the wheels and having common resilient means controlling both said vertical oscillation of the wheels and the banking action of said arms, means to maintain the distance between said drive wheels substantially constant at all times, and means to guide said wheel knuckles to maintain said wheels substantially parallel in plan view at all times.

24. A vehicle comprising a superstructure, a plurality of pairs of wheels for supporting the same including at least one pair of drive wheels, flexible means for driving said drive wheels, a wheel knuckle pivotal upon a substantially vertical axis for guiding each drive wheel, a banking arm suspension for each drive wheel providing for independent vertical oscillation of the wheels, means to maintain the distance between said drive wheels substantially constant at all times, and means to block said wheel knuckles against steering at all times without interfering with said oscillation and banking movements.

25. A vehicle of the class described, comprising a superstructure, a plurality of pairs of wheels including a pair of drive wheels therefor, a corresponding number of pairs of interconnected banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, an extensible drive shaft for each drive wheel extending from said differential to the wheel, a universal joint at each end of each drive shaft to provide for vertical oscillation of each drive wheel relative to said differential, and means securing said differential in fixed position to the underside of said superstructure.

26. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and a pair of laterally spaced links suspending said differential from said superstructure and controlling the position of the differential during lateral movement of the superstructure.

27. A vehicle of the class described, comprising a superstructure, a plurality of pairs of wheels including a pair of drive wheels therefor, a corresponding number of pairs of cooperating banking arms effecting inward banking of the superstructure on curves in response to lateral movement of the superstructure caused by centrifugal forces, the banking arms for said drive wheels including the wheels and providing an independent suspension for each wheel from the superstructure, means to maintain the distance between the drive wheels substantially constant at all times, a differential disposed between said drive wheels, a drive shaft for each drive wheel extending from said differential to the wheel, a universal joint at each end of each drive shaft to provide for vertical oscillation of each drive wheel relative to said differential, and a pair of laterally spaced links pivoted to the superstructure at one of the corresponding ends of the links and to the differential at the other of the corresponding ends of the links with the axes of said pivots parallel to thereby suspend the differential from said superstructure and control the position of the differential during lateral movement of the superstructure.

JOACHIM KOLBE.

REFERENCES CITED

The following references are of record in the file of this patent:

UNITED STATES PATENTS

| Number | Name | Date |
|---|---|---|
| 1,476,447 | Holle | Dec. 4, 1923 |
| 1,946,948 | Roos | Feb. 13, 1934 |
| 2,015,700 | Wagner | Oct. 1, 1935 |
| 2,110,819 | Poirier | Mar. 8, 1938 |
| 2,122,308 | Banks | June 28, 1938 |
| 2,271,505 | Kolbe | Jan. 27, 1942 |
| 2,341,726 | Kolbe | Feb. 15, 1944 |

FOREIGN PATENTS

| Number | Country | Date |
|---|---|---|
| 512,296 | Germany | Nov. 8, 1930 |